United States Patent
Cook et al.

(10) Patent No.: US 7,172,815 B2
(45) Date of Patent: Feb. 6, 2007

(54) LOW GAUGE STRETCH WRAP FILM

(75) Inventors: John Cook, North Canton, OH (US); Brooke Kitzmiller, North Canton, OH (US)

(73) Assignee: Pliant Corporation, Schaumburg, IL (US)

( * ) Notice: Subject to any disclaimer, the term of this patent is extended or adjusted under 35 U.S.C. 154(b) by 0 days.

(21) Appl. No.: 10/092,381

(22) Filed: Mar. 4, 2002

(65) Prior Publication Data

US 2003/0118853 A1    Jun. 26, 2003

Related U.S. Application Data

(60) Provisional application No. 60/326,834, filed on Oct. 3, 2001.

(51) Int. Cl.
*B32B 27/08* (2006.01)
*B32B 27/32* (2006.01)

(52) U.S. Cl. .................. 428/516; 428/220; 428/336

(58) Field of Classification Search ............. 428/220, 428/219, 336, 516, 520
See application file for complete search history.

(56) References Cited

U.S. PATENT DOCUMENTS

| | | | |
|---|---|---|---|
| 2,699,457 A | 1/1955 | Ziegler et al. | 585/518 |
| 2,862,917 A | 12/1958 | Anderson et al. | 526/352 |
| 2,905,645 A | 9/1959 | Anderson et al. | 502/114 |
| 3,058,963 A | 10/1962 | Vandenberg | 526/153 |
| 4,668,752 A | 5/1987 | Tominari et al. | 526/348.2 |
| 5,208,096 A * | 5/1993 | Dohrer | 428/218 |
| 5,399,426 A | 3/1995 | Koch et al. | 428/335 |
| 5,595,050 A | 1/1997 | Koch et al. | 53/441 |
| 5,955,205 A * | 9/1999 | Ramsey et al. | 428/516 |
| 6,265,055 B1 | 7/2001 | Simpson et al. | 428/213 |

\* cited by examiner

*Primary Examiner*—D. S. Nakarani
(74) *Attorney, Agent, or Firm*—McAndrews, Held & Malloy, Ltd.

(57) ABSTRACT

Stretch wrap films are used to hold goods to pallets during storage and shipping. A multilayer stretch wrap film with at least one outer layer of polypropylene and other layers of blends of polyethylenes. The film of the present invention optimizes physical properties enabling the film to have sufficient cling while creating a tolerable noise level upon unwinding. The optimized properties include good clarity, high load containment, high puncture resistance, high stretch and good tear resistance.

13 Claims, 4 Drawing Sheets

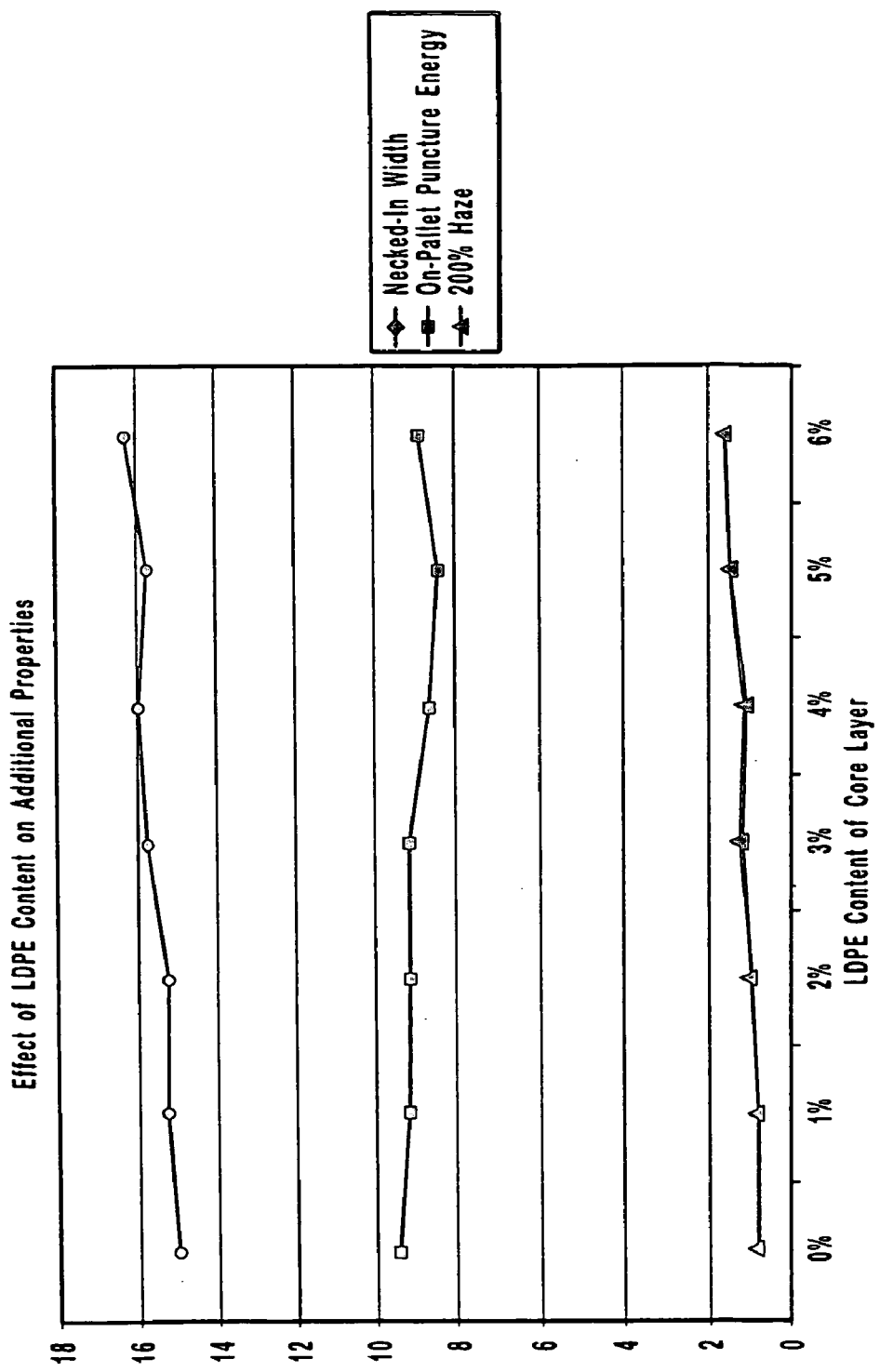

LOW GAUGE STRETCH WRAP FILM

This utility patent application claims priority to U.S. Provisional Patent Application Ser. No. 60/326,834 filed Oct. 3, 2001, entitled Low Gauge Stretch Wrap Film. Ser. No. 60/326,834 is hereby incorporated by reference.

TECHNICAL FIELD

The present invention is directed to a multilayer stretch wrap film. More particularly the stretch wrap film of the present invention has a core, a cling layer and a non cling layer.

BACKGROUND OF THE INVENTION

Stretch wrap film is commonly used to wrap a load on a pallet. The film holds goods on a pallet so that the pallet can be stored, shipped and maneuvered. Several physical properties are required for good stretch wrap film. The film should have good stretch, puncture resistance and load containment. The film should also resist tear propagation. The film must have clarity or good optics so that the contents of the pallet can be viewed through the film.

Stretch wrap film may have a non-cling surface and a cling surface opposite the noncling surface. The non-cling surface generally does not cling to itself and prevents adjoining pallets from sticking to one another. The cling surface enables the film to stick to itself. The cling surface should have sufficient cling so that the film sticks to itself when wrapped around a pallet and does not unravel. However, as cling of the film increases, so does the noise the film creates when it is unwound from the roll during the wrapping process. The noise levels created by unwinding some films with polypropylene non-cling layers are too high to be tolerated by individuals working around the pallets without ear protection, due to the need for an aggressive cling agent to stick to the polypropylene. Therefore, a film is needed with sufficient cling that also yields a tolerable noise level.

There is a constant need to decrease the cost of film for wrapping and shipping pallets. Accordingly, what is needed is a film that has comparable or superior load containment, stretch, puncture resistance, and tear resistance to other stretch wrap films but may be used at a lower gauge than commonly used stretch wrap films. The cost of film to wrap the pallet is thereby decreased.

SUMMARY OF THE INVENTION

It is an object of the present invention to provide a stretch wrap film with a balanced set of beneficial properties including high puncture resistance, load containment, stretch, tear resistance and clarity.

Another object of the present invention is to provide a stretch wrap film with sufficient cling that also creates a tolerable noise upon unwrapping.

The films of the present invention have at least three layers, a core layer, a cling layer, and a non-cling layer. Each core layer preferably contains a small percentage of low density polyethylene combined with linear low density polyethylene, a blend that optimizes several properties, including ultimate stretch, on-pallet stretch, load containment, stretch, puncture resistance and tear resistance of the film. The core layer or layers make up about 40% to about 96% of the thickness of the film. The film of the present invention may have three or more layers. In a three layer embodiment, the film has a single core layer, a cling layer, and a non cling layer. In a five layer embodiment, the film has two additional core layers. In a seven layer embodiment, the film has five core layers, a cling layer and a non-cling layer.

The cling layer may contain a balance of plastomer and ultra-low density polyethylene that optimizes the cling to noise characteristic of the film. The cling layer makes up from about 2% to about 30% of the thickness of the film. In a preferred embodiment the cling layer is about 10% of the overall thickness of the film.

Additional aspects and advantages of this invention will be apparent from the following detailed description of preferred embodiments thereof, which proceeds with reference to the accompanying drawings.

BRIEF DESCRIPTION OF THE DRAWINGS

FIG. 6 is a graph illustrating necked-in width, on-pallet puncture energy, and haze at 200% stretch for Examples 3–9.

DETAILED DESCRIPTION OF PREFERRED EMBODIMENTS

Figure 1:
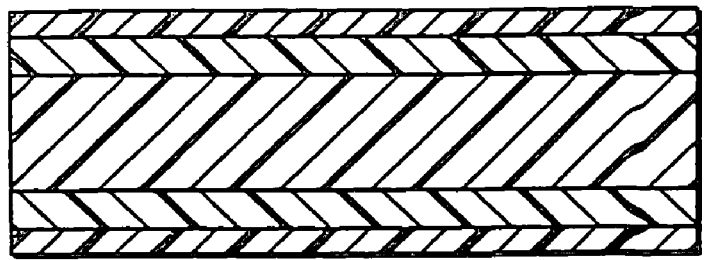
FIG. 1 is a depiction of the film of the present invention having five layers.

The present invention relates to stretch films with an optimized balance of beneficial properties. The stretch films of the present invention have three or more layers, including a core layer, a cling layer and a non-cling layer. Embodiments of the inventive films with five or fewer layers are represented by the construction A/B/C/D/E as shown in FIG. 1. In this construction, A is a cling layer, E is a non-cling layer and B, C, and D may be the same or different polymer resins, selected to optimize the features discussed above in connection with the core layer, namely load containment, stretch, and puncture resistance while maintaining adequate tear propagation.

Figure 2:
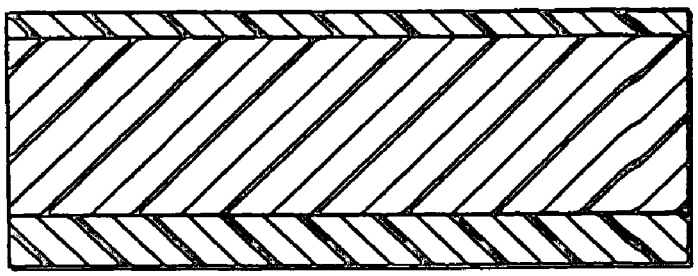
FIG. 2 is a depiction of the film of the present invention having three layers.
Figure 3:
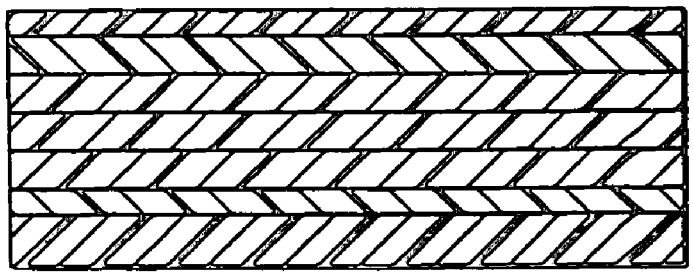
FIG. 3 is a depiction of the film of the present invention having seven layers.

FIG. 2 depicts an embodiment in which the film has three layers. FIG. 3 depicts an embodiment with seven layers, represented by the construction $A/B/C_1/C_2/C_3/D/E$. The thicknesses shown in these figures are exemplary. For example, the film shown in FIG. 1, has the construction A/B/C/D/E with corresponding percentage thicknesses of 10/15/45/10/20 of the total thickness of the film. The construction A/C/E shown in FIG. 2 is depicted with corresponding percentage thicknesses of 10/70/20. The construction $A/B/C_1/C_2/C_3/D/E$, as shown in FIG. 3, is shown with corresponding thicknesses of 10/15/15/15/15/10/20.

Note that various combinations are possible. For example, the film depicted in FIG. 3 may have five identical core layers, $B/C_1/C_2/C_3/D$. Alternatively, the seven layer film may have four core layers, $B/C_1/C_2/C_3$, and two adjoining non-cling layers, D/E, and a cling layer A.

The multilayer cast films of the present invention are typically manufactured by feed block coextrusion. Alternatively, the stretch films of the present invention may be made by blown film (tubular) coextrusion. Methods for feed block and blown film extrusion are disclosed in The Wiley Encyclopedia of Packaging Technology, pp. 233–38 (Aaron L. Brody et al. eds., 2nd Ed. 1997), which is incorporated herein by reference. Methods for film extrusion are also disclosed in U.S. Pat. No. 6,265,055, which is also incorporated herein by reference.

The cling layer of the film of the present invention enables the film to cling to itself when the film is wrapped on a load. The cling layer is from about 2% to about 30% of the thickness of the film, more preferably about 10%. The cling layer has a balance of ultra low density polyethylene and plastomer enabling the film to have sufficient cling without creating an intolerable noise level upon unwinding the film.

The cling layer may contain from about 60% to 100% by weight of an ultra low density polyethylene. Ultra low density polyethylene (hereinafter "ULDPE") is sometimes also known as very low density polyethylene. ULDPE is ethylene copolymerized with at least one $C_3$–$C_{10}$ α-olefin, more preferably a $C_8$ α-olefin. The resulting ULDPE preferably has a density ranging from about 0.885 g/cm$^3$ to about 0.920 g/cm$^3$, more preferably from about 0.888 g/cm$^3$ to about 0.910 g/cm$^3$, and a melt index ranging from 1.0 g/10 min to 20 g/10 min, more preferably ranging from about 2 g/10 min to about 10 g/10 min. In a preferred embodiment, the cling layer contains about 85% of a ULDPE that is ethylene copolymerized with a $C_8$ α-olefin with a density of about 0.900 g/cm$^3$, and a melt index of about 5.

ULDPE can be produced by a variety of processes, including gas phase, solution and slurry polymerization as disclosed in The Wiley Encyclopedia of Packaging Technology pp. 748–50 (Aaron L. Brody et al. eds., 2nd Ed. 1997), referenced above. ULDPE is typically manufactured using a Ziegler-Natta catalyst, although a number of other catalysts may be used. For example, ULDPE may be manufactured with a metallocene catalyst. Alternatively, ULDPE may be manufactured with a catalyst that is a hybrid of a metallocene catalyst and a Ziegler-Natta catalyst. Methods for manufacturing ULDPE are also disclosed in U.S. Pat. No. 5,399,426, U.S. Pat. No. 4,668,752, U.S. Pat. No. 3,058,963, U.S. Pat. No. 2,905,645, U.S. Pat. No. No. 2,862,917, U.S. Pat. No. 2,699,457, which are incorporated by reference herein. The density of ULDPE is achieved by copolymerizing ethylene with a sufficient amount of one or more monomers. The monomers are preferably selected from 1-butene, 1-hexene, 4-methyl-1-pentene and 1-octene.

The cling layer may also include a plastomer in a range from 0% to about 40% by weight of the cling layer, more preferably about 15%. The plastomer is preferably ethylene copolymerized with a $C_3$–$C_{10}$ α-olefin, having a density in the range from about 0.850 g/cm$^3$ to about 0.900 g/cm$^3$, more preferably of about 0.860 g/cm$^3$ to about 0.880 g/cm$^3$, and a melt index of about 1.0 g/10 min to about 20.0 g/10 min, more preferably from about 2.0 to about 10.0 g/10 min. The cling layer preferably contains 15% plastomer with a density of about 0.875 g/cm$^3$ and a melt index of about 3.0 g/10 min. The plastomer is manufactured by the same process described above with reference to ULDPE, except that a higher amount by weight of one or more monomers is copolymerized with ethylene. In a preferred embodiment, the plastomer is ethylene copolymerized with a $C_8$ α-olefin, which has an unstretched cling of 250 g and a 200% stretched cling of 66 g as measured by ASTM D 4649. Cling is the strength required, in grams, to pull apart overlapping film along a test section.

While ULDPE provides the film with limited cling, the plastomer provides greater cling in the resulting film. Films of the present invention containing percentage weight of ULDPE in the higher ranges specified herein for ULDPE create less noise during unwrapping and have less cling. In contrast, films with a higher percentage weight of plastomer provide greater cling but more noise. The ranges provided for ULDPE and plastomer provide a balanced film, with a sufficient amount of cling and an intermediate noise level.

The stretch film of the present invention has one or more core layers. The core layers or layer make up about 40% to about 96% of the thickness of the film, more preferably about 70% of the thickness of the film. Each core layer includes a low density polyethylene in an amount ranging from about 0.01% to about 3% by weight of the core layer and a linear low density polyethylene (hereinafter "LLDPE") in an amount ranging from about 97 to about 99.9% by weight of the core layer. More particularly, the core layer includes a low density polyethylene in an amount less than 3%.

The LDPE of the core layer may have a density ranging from about 0.900 g/cm$^3$ to about 0.940 g/cm$^3$, more preferably from about 0.920 g/cm$^3$ to about 0.930 g/cm$^3$ and a melt index ranging from about 0.10 g/10 min to about 10.0 g/10 min, more preferably from about 0.2 g/10 min to about 0.4 g/10 min. LDPE is generally used for heavy bags, such as ice bags or shipping sacks, which normally have a thickness from 1.5 mil to 4.0 mil. In contrast, the film of the present invention preferably has a thickness of 0.5 mil to 1.5 mil. A mil is a unit of distance equivalent to 0.001 inch (25.4 microns).

The LDPE may be ethylene homopolymer or ethylene copolymerized with one or more monomers, such as vinyl acetate, methyl acrylate, acrylic acid, ethyl acrylate, or a $C_3$–$C_{10}$ α-olefin. The LDPE is preferably ethylene homopolymer with a density of about 0.921 g/cm$^3$ and a melt index of about 0.2%10min. An alternative embodiment of the stretch film contains an LDPE that is a copolymer. Methods for manufacturing LDPE are disclosed in The Wiley Encyclopedia of Packaging Technology (Aaron L. Brody et al. eds., 2nd Ed. 1997) pp. 753–754 and in U.S. Pat. No. 5,399,426, both of which are referenced above.

The LLDPE is ethylene copolymerized with one or more $C_3$–$C_{10}$ α-olefins, with a density ranging from about 0.900 to about 0.940 g/cm$^3$, more preferably from about 0.910 to about 0.930 g/cm$^3$, and a melt index ranging from about 1.0 to about 20.0 g/10 min., more preferably from about 1.5 to about 6.0 g/10 min. Similar to the ULDPE discussed above, LLDPE used in the films of the present invention is preferably ethylene copolymerized with one monomer of 1-butene, 1-hexene, 4-methyl-1-pentene, or 1-octene. LLDPE may alternatively contain more than one comonomer selected from α-olefins such as 1-butene, 1-hexene, 4-methyl-1-pentene, and/or 1-octene. The core layer preferably contains about 97% to about 99.9% of LLDPE that is ethylene copolymerized with a C8α-olefin, with a density of 0.917 g/cm$^3$ and a melt index of 4.0 g/10 min.

LLDPE is manufactured by the same processes discussed above in connection with ULDPE. For example, ethylene may be copolymerized using various catalysts such as a Ziegler-Natta catalyst or a metallocene catalyst, or a combination of these catalysts. LLDPE has a higher density than ULDPE and plastomer because it is copolymerized with a lower concentration of comonomer than ULDPE or plastomer.

The density ranges and melt indexes as disclosed herein for ULDPE and LLDPE and for plastomer and ULDPE partially overlap. However, these polymers may be further distinguished by crystallinity, measured as melt point. A ULDPE with the same melt index and density of LLDPE will have a lower melt point than LLDPE as disclosed herein. Similarly, a plastomer with the same density and melt index of a ULDPE, will have a lower melt point than ULDPE.

As mentioned above, the film of the present invention further includes a non-cling layer of polypropylene. The polypropylene non-cling layer may have a density ranging from about 0.890 g/cm$^3$ to about 0.910 g/cm$^3$, more preferably from about 0.895 g/cm$^3$ to about 0.905 g/cm$^3$ and a melt flow rate from about 2.0 g/10 min to about 40.0 g/10 min. The polypropylene maybe a homopolymer or may be the product of propylene copolymerization with a comonomer, preferably ethylene. Alternatively, propylene may be copolymerized with another comonomer, such as a $C_3$–$C_{10}$ α-olefin. The propylene of the present invention is preferably a copolymer of propylene and ethylene, the ethylene content ranging from 0 to about 10% by weight of the copolymer, more preferably in an amount ranging from about 1% to about 5% by weight. A preferred embodiment has a propylene copolymerized with ethylene, the ethylene content ranging from about 2% to about 4% by weight known as random copolymer polypropylene. The random copolymer of polypropylene may have a density of about 0.905 g/cm$^3$ and a melt flow rate of about 10.0 g/10 min. The method for measuring polypropylene melt flow rate is disclosed in The Wiley Encyclopedia of Packaging Technology (Aaron L. Brody et al. eds., 2nd Ed. 1997) p. 677 and methods for manufacturing polypropylene are disclosed in Kirk-Othmer Concise Encyclopedia of Chemical Technology pp. 1420–21 (Jacqueline I. Kroschwitz et al. eds., 4th Ed. 1999), which is incorporated herein by reference.

The amount of each polymer included in the inventive films is selected to create an optimal balance of several physical properties. The stretch films of the present invention balance increased load and holding containment and stretch with clarity, puncture resistance and resistance to tear propagation. The inventive stretch films have a core layer that includes linear low density polyethylene with a small percentage of low density polyethylene. The low density polyethylene provides good load containment, stretch and necked-in width. As will be discussed in more detail below in conjunction with examples, the amount of low density polyethylene is a low percentage, in the range of 0.01% to about 3%, because at higher percentages, low density polyethylene reduces the film's puncture resistance, resistance to tear propagation and clarity. Therefore, the stretch film of the present invention optimizes load containment, stretch, puncture resistance and clarity by incorporating a small percentage of low density polyethylene.

It has been discovered that the greatest benefits from the balance of properties of the present invention are found in gauges ranging from about 45 gauge to about 90 gauge. Even more beneficial are the properties of the film of the present invention at gauges ranging from about 50 gauge to about 80 gauge. At these gauge ranges, it has been discovered that the film performs better than a higher gauge film of the prior art, in terms of load containment, stretch, puncture resistance, clarity and tear propagation resistance. Therefore, the films of the present invention preferably have a gauge ranging from about 45 gauge to about 90 gauge, more preferably from about 50 gauge to about 80 gauge. At gauges higher than about 90, the films of the present invention do not perform significantly better in terms of load containment, stretch, puncture resistance, clarity and tear propagation resistance when compared with prior art films having the same gauge. Note, however, that films having gauges higher than about 90 gauge still perform satisfactorily in terms of load containment, stretch, puncture resistance, clarity and tear propagation resistance. Note also that these films of the present invention are designed so that they have sufficient cling while also creating tolerable noise upon unwinding.

It is believed that the enhanced performance of the inventive films is optimized at these gauges because of the manner in which the films are used. Generally, stretch wrap machines run film at a pre-stretch of 200% to 300%. At this level of pre-stretch, the inventive films below a gauge of about 90 will provide higher resistance to stretch and become stiffer than films of gauges above about 90. The increased level of stiffness at a pre-stretch of 200% to 300% provides enhanced load containment and puncture resistance for inventive films having gauges no greater than about 90 gauge or 80 gauge.

Because of the beneficial properties of the inventive films at low gauges, the optimized balance of stretch, load containment, puncture resistance and clarity, the films may be used at a decreased gauge or thickness over stretch films of the prior art. Conventionally, stretch films range from about 0.4 mil to about 3 mil. Because of the balanced properties of the film of this invention, a lower gauge film can be used while achieving superior performance as compared to prior art films of higher gauges. As a result, the end user can use less weight of the inventive film to wrap a pallet than would be required to wrap the same load with a film of the prior art. Since less film is used, it provides a cost advantage.

One skilled in the art will recognize that the overall thickness of the stretch film can be varied depending on the particular end use for which the film is manufactured. The films of the present invention have a thickness that is generally in the range of typical thickness for stretch wrap films, but may be easily adjusted by one skilled in the art to fit the desired end use. However, as discussed above, the beneficial properties of the films of the present invention, such as increased stretch puncture resistance and load containment, may allow the films to be used at a decreased gauge or thickness over stretch films of the prior art.

In addition to the properties discussed above, the stretch films of the present invention optimize the amount of cling while minimizing the noise created upon unwinding film. The noise of the film unwinding increases as the cling of the film increases. In the cling layer, the amount of ultra low density polyethylene, a polymer that provides intermediate cling, is balanced against the amount of plastomer, a lower density polyethylene with high cling. As a result, the film has a cling layer that provides sufficient cling with an acceptable noise level upon unwinding.

EXAMPLES OF THE PREFERRED EMBODIMENTS

Examples are provided of the present invention in order to compare the properties of the composition by varying the content of the layers in the films. Example 1 describes a stretch film composition prepared in accordance with the present invention. Example 2 is a hypothetical example of the inventive film. Examples 3–9 describe film compositions similar to Example 1, except that the level of LDPE in the core layer is varied from 0% to 6% incrementally by one percentage. Tables 3–9 describe the physical properties of the Examples 3–9 which are graphically presented in FIGS. 3–6. Comparative Examples 1–28 compare a film as described in Example 1 with various commercially available prior art films.

Example 1

Example 1 is a film containing five layers, as represented by the construction A/B/C/D/E with corresponding percentage thicknesses of 10/15/45/10/20 of the total thickness of the film. The polymers in layers A–D of the film as described in the table below are available from the Dow Chemical Company (hereinafter ("Dow")) in Houston, Tex. The polymer in layer E of the film as described in the table below is available from Huntsman Polymers Corporation (hereinafter "Huntsman") in Odessa, Tex. The tradename of each polymer is listed in parenthesis next to its description. The film was formed from the following components:

TABLE A

| Layer | Composition | % of Layer by Wt. |
|---|---|---|
| A | Polyethylene copolymerized with a $C_8$ olefin, with a density of 0.900 g/cm$^3$ and a melt index of 5.0 g/10 min. (ULDPE) (61520.09L) | 85% |
|  | Polyethylene copolymerized with a $C_8$ olefin, with a density of 0.875 g/cm$^3$ and a melt index of 3.0 g/10 min (Plastomer) (KC8852) | 15% |
| B, C, D | Polyethylene copolymerized with a $C_8$ olefin, with a density of 0.917 g/cm$^3$ and a melt index of 4.0 g/10 min. (LLDPE) (Elite 5230) | 97% |
|  | Polyethylene homopolymer with a density of g/cm$^3$ and a melt index of 0.2 g/10 min. (LDPE) (LDPE 132i) | 3% |
| E | Random copolymer polypropylene with a density of 0.905 g/cm$^3$ and a melt flow rate of 10.0 g/10 min. (13S10A) | 100% |

The film, with a 1.15 mil (29.2 micron) thickness, had the following properties: (a) high puncture resistance, about 180 g/mil, by dart drop impact F-50 (ASTM D1709); (b) good optical quality, less than 3% haze (ASTM D1003); (c) high load containment and strength, 5.9 KPSI in the machine direction and 4.4 KPSI in the cross direction (ASTM D882); (d) good stretch, 540% in the machine direction and 640% in the cross direction (ASTM 13 D882); (e) good tear resistance, 390 g/mil MD, and 690 g/mil CD (ASTM D1922); and (f) sufficient non-cling on the non-cling side of the film, coefficient of friction of 1.8 (ASTM D1894). The film had a cling of about 190 grams unstretched and a cling of about 150 grams at 200% stretch according to ASTM test method D4649. As discussed above, the film of the present invention also has a tolerable noise level while still providing sufficient cling.

Example 2

In another embodiment, the film has three layers, represented by the construction A/C/E, wherein the layers have a corresponding percentages of thickness of 10/70/20. Such a film is illustrated in FIG. 2. The polymers in the film may be obtained, as specified below, from Dow in Houston, Tex., ExxonMobil Chemical ("ExxonMobil") in Houston, Tex. and Equistar Chemical Company ("Equistar") in Houston, Tex. The film has the following composition:

TABLE B

| Layer | Composition | % of Layer by Wt. |
|---|---|---|
| A | Polyethylene copolymerized with a $C_6$ α-olefin, with a density of 0.900 g/cm$^3$ and a melt index of 5.0 g/10 min. (ULDPE) (Dow, formerly Union Carbide, Flexomer 9042) | 85% |
|  | Polyethylene copolymerized with a $C_4$ α-olefin with a density of 0.873 g/cm$^3$ and a melt index of 4.5 g/10 min. (plastomer) (ExxonMobil Exact 4049) | 15% |
| C | Polyethylene copolymerized with a $C_6$ α-olefin with a density of 0.917 g/cm$^3$ and a melt index of 3.5 g/10 min. (LLDPE) (ExxonMobil Exceed 357C32) | 97% |
|  | Polyethylene homopolymer with a density of 0.918 g/cm$^3$ and a melt index of 0.25 g/10 min. (LDPE) (Equistar Petrothene NA 940) | 3% |
| E | Random copolymer polypropylene with a density of 0.900 g/cm$^3$ and a melt flow rate of 10.0 g/10 min. (Equistar Petrothene PP8310-GO) | 100% |

This film would be expected to have optimized beneficial properties, including good cling but tolerable noise, good tear resistance, high puncture resistance, high load containment and high stretch capabilities. As will be recognized by one skilled in the art, although Example 1 identifies a five layer film and Example 2 identifies a three layer film, the same compositions identified can be used to make a stretch wrap film which includes one or more core layers, at least one cling layer and at least one non-cling layer. For example, the same compositions may be used to make a seven layer film with five core layers, one cling layer and one non-cling layer.

Examples 3–9

Seven examples, Examples 3–9, have been tested with varying levels of LDPE. Examples 3–9 contain the same composition as described above in Example 1 with two variations. In Example 3, the core layer contains no LDPE. In each remaining comparative example, the core layer contains a small percentage of LDPE. Example 4 includes a core layer with 1% LDPE; Example 5 includes a core layer with 2% LDPE; Example 6 includes a core layer with 3% LDPE; Example 7 includes a core layer with 4% LDPE; Example 8 includes a core layer with 5% LDPE; and Example 9 includes a core layer with 6% LDPE. In addition, Examples 3–9 each include a skin layer made of a polypropylene resin that is designated Dow DS6D82 instead of the Huntsman 13S10A that is identified in Example 1. Dow DS6D82 is a random copolymer polypropylene resin with a density of 0.9 g/cm$^3$ and a melt flow rate of 7 g/10 min.

These examples were tested for the following seven properties: ultimate stretch, on-pallet stretch, stretch force at 100%, containment force, necked-in width, on-pallet puncture energy (puncture resistance) and haze at 200% stretch. Ultimate stretch is tested by incrementally stretching the film from 0% until the film breaks and measuring the stretch percentage at which the film breaks. Stretch force is tested by measuring the amount of force necessary to stretch the film to a specified percentage, 100% in this case. Ultimate stretch and stretch force represent measurements of the film's elongational properties. Haze was measured by ASTM D1003, a method that includes stretching the film to 200% and testing the haze with a hazemeter.

On-pallet stretch, necked-in width, containment force and puncture energy measurements were all conducted with a Lantech Q300, a turntable stretch wrapper. The results for these comparative examples were obtained by running the Lantech Q300 at 200% prestretch with 16 lbs of secondary force and 9 wraps around a testing cage. On-pallet stretch is measured by marking the roll as it unwinds and then measuring the distance between the marks on the cage. Necked-in width is the measurement of the width of the film on the cage as compared to the original width, which was 20 inches. Containment force is a measurement of the force that 9 wraps of film exert on a load cell bar that is attached to the cage. Puncture energy is measured with a hand force gauge that is punched through the film. The hand force gauge measures the amount of force required to punch through the film.

Figure 4:
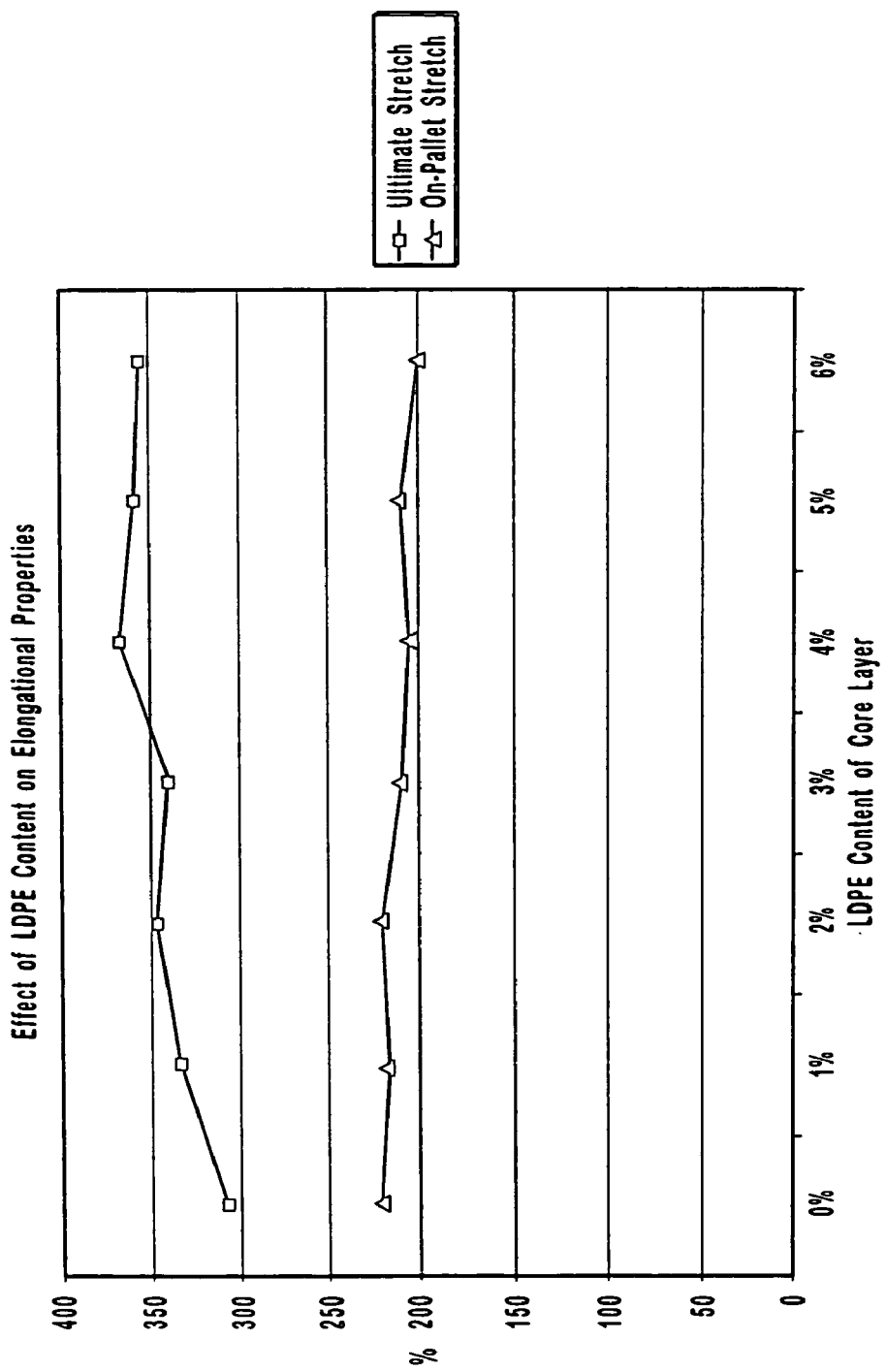
FIG. 4 is a graph illustrating ultimate stretch and on-pallet stretch for Examples 3–9.
Figure 5:
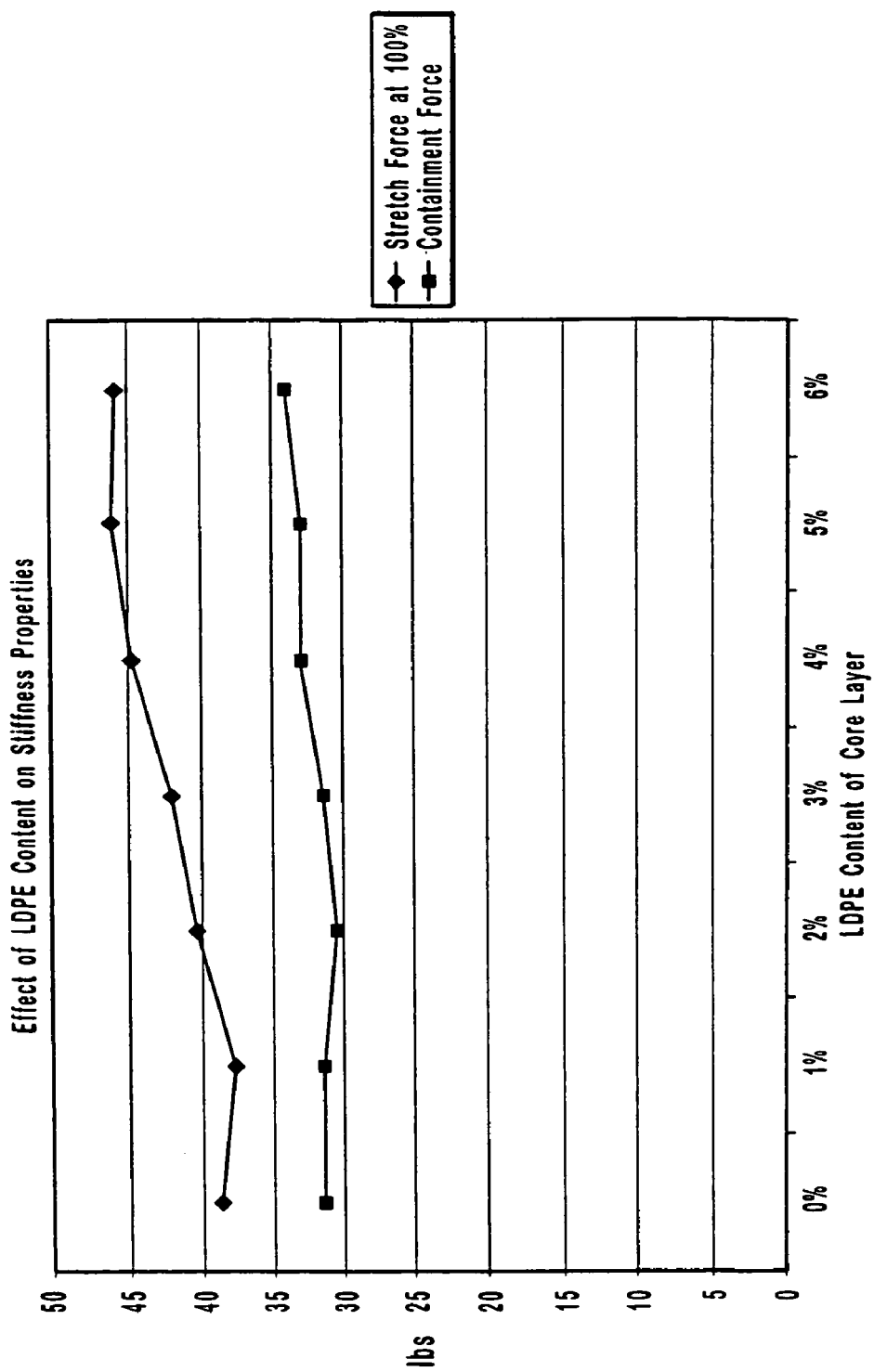
FIG. 5 is a graph illustrating stretch force and containment force for Examples 3–9.

Table C shows the ultimate stretch for each of the six comparative examples. Table D shows the on-pallet stretch for each example. The data contained in these tables is illustrated in FIG. 4. Table E shows the stretch force at 100% for each example and Table F shows the containment force for each example. The data of Tables E and F is illustrated in FIG. 5. Table H shows necked in width, Table I shows on-pallet puncture energy and Table G shows haze at 200% stretch. FIG. 6 illustrates these three properties in graph form.

TABLE C

Ultimate Stretch (%)

| Example | Test 1 | Test 2 | Test 3 | Ave | Std. Deviation |
|---|---|---|---|---|---|
| 3 | 305 | 308 | 308 | 307.00 | 1.73 |
| 4 | 336 | 325 | 339 | 333.33 | 7.37 |
| 5 | 360 | 339 | 341 | 346.67 | 11.59 |
| 6 | 349 | 336 | 335 | 340.00 | 7.81 |
| 7 | 370 | 364 | 363 | 365.67 | 3.79 |
| 8 | 353 | 360 | 361 | 358.00 | 4.36 |
| 9 | 351 | 314 | 359 | 355.00 | 5.66 |

TABLE D

On Pallet Stretch

| Example | Stretch (%) |
|---|---|
| 3 | 222.5 |
| 4 | 217.5 |
| 5 | 222.5 |
| 6 | 212.5 |
| 7 | 207.5 |
| 8 | 212.5 |
| 9 | 202.5 |

TABLE E

Stretch Force at 100% Stretch (lbs.)

| Example | Test 1 | Test 2 | Test 3 | Average | Std. Deviation |
|---|---|---|---|---|---|
| 3 | 38 | 38 | 40 | 38.67 | 1.15 |
| 4 | 38 | 38 | 37 | 37.67 | 0.58 |
| 5 | 41 | 40 | 40 | 40.33 | 0.58 |
| 6 | 42 | 42 | 42 | 42.00 | 0 |
| 7 | 44 | 45 | 45 | 44.67 | 0.58 |
| 8 | 45 | 45 | 48 | 46.00 | 1.73 |
| 9 | 46 | 45 | 46 | 45.67 | 0.58 |

TABLE F

Containment Force

| Example | Force (lbs.) |
|---|---|
| 3 | 31.5 |
| 4 | 31.5 |
| 5 | 30.5 |
| 6 | 31.5 |
| 7 | 33.0 |
| 8 | 33.0 |
| 9 | 34 |

TABLE G

Stretch Force at 200% Haze (%)

| Example | Test 1 | Test 2 | Test 3 | Test 4 | Test 5 | Average | Std. Deviation |
|---|---|---|---|---|---|---|---|
| 3 | 0.75 | 0.79 | 0.79 | 0.79 | 0.84 | 0.79 | 0.031937 |
| 4 | 0.75 | 0.82 | 1.03 | 0.82 | 0.69 | 0.82 | 0.128335 |
| 5 | 0.91 | 1.05 | 1.06 | 1.1 | 0.95 | 1.01 | 0.080187 |
| 6 | 1.29 | 1.22 | 1.23 | 1.29 | 1.26 | 1.26 | 0.032711 |
| 7 | 1.21 | 1.15 | 1.06 | 1.16 | 1.21 | 1.16 | 0.0614 |
| 8 | 1.27 | 1.36 | 1.67 | 1.5 | 1.49 | 1.46 | 0.152217 |
| 9 | 1.32 | 1.62 | 1.63 | 1.9 | 1.59 | 1.61 | 0.205597 |

TABLE H

Necked-In Width Based on 20 Inch Film

| Example | Width (inches) |
|---|---|
| 3 | 15.00 |
| 4 | 15.25 |
| 5 | 15.25 |
| 6 | 15.75 |
| 7 | 16.00 |
| 8 | 15.75 |
| 9 | 16.25 |

TABLE I

On Pallet Puncture Energy

| Example | lbs. |
|---|---|
| 3 | 9.50 |
| 4 | 9.25 |
| 5 | 9.25 |
| 6 | 9.25 |
| 7 | 8.75 |
| 8 | 8.50 |
| 9 | 9.00 |

As can be seen by Tables C, E and F and FIGS. 4–5, ultimate stretch, stretch force and containment force rise as the level of LDPE in the core layer is increased above 3%. As shown in Table D and FIG. 4, on-pallet stretch decreases slightly as the amount of LDPE is increased above 3%. Similarly, as can be seen in Table H and FIG. 6, necked-in width increases slightly at the level of LDPE in the core layer reaches 4%. However, as can be seen in Tables G and I and FIG. 6, haze increases and on-pallet puncture energy decreases as the level of LDPE in the core layer is increased above 3%. At a level of about 3% or less LDPE in the core layer, the film has good stretch, strength and necked-in width while having optimal clarity and puncture resistance. Therefore, levels of LDPE in the core layer at about 3% or less provide an optimal balance of the beneficial properties provided by LDPE.

Comparative Examples 1–28

Testing for the following examples was performed with a variety of different equipment in various states of repair and at a variety of settings, with various operating personnel at various customer facilities. In all cases, the tests were performed at a customer's facilities that used only the competitor's film. Some of the tests were performed with Lantech 19 equipment, some with Orion equipment and others with Signode equipment. Each of the examples discussed below compares a commercially prepared film of the composition detailed in Example 1 (referred to hereafter as "Sample Film") to a film of the prior art. However, since the testing was conducted on different equipment, films prepared from the composition in Example 1 having the same gauge produced different results. Gauge is a measure of thickness equivalent to 0.01 mil.

The tests results below illustrate the optimization of film properties, particularly at gauges less than about 80 gauge. Despite the varied conditions under which the tests were conducted, the sample films consistently performed nearly as well or better than competitor's films of higher gauges. Thus, it can be seen that low gauges of the inventive film can be used for the same applications as higher gauge films of the prior art. Even though in some of the tests described below, the sample films had a slightly lower containment force weight than the higher gauge prior art film the benefit of using the lower gauge film of the present invention out weighs any slight loss of containment force.

Comparative Example 1

A Sample Film was prepared for comparison with a film manufactured by AEP under the tradename A12090. The AEP film was a 90 gauge film while the film of Example 1 was a 63 gauge film. It was determined that the AEP film had a film weight/load of 9.9 ounces and the Example 1 film had a film weight/load of 4.9 ounces. The AEP film had a containment force of 23 lbs compared with 28 lbs for the film of Example 1.

Comparative Example 2

A Sample Film was prepared for comparison with a film manufactured by AEP under the tradename A1 2090. The AEP film was a 90 gauge film while the Sample Film was a 51 gauge film. It was determined that the AEP film had a film weight/load of 12.9 ounces and the Sample Film had a film weight/load of 5.2 ounces. Containment force was not measured for this comparative example.

Comparative Example 3

A Sample Film was prepared for comparison with a film manufactured by Tyco/Armin. The Tyco/Armin film was a 70 gauge film while the Sample Film was a 51 gauge film. It was determined that the Tyco/Armin film had a film weight/load of 3.1 ounces and the Sample Film had a film weight/load of 1.7 ounces. The Tyco/Armin film had a containment force of 23 lbs compared with 25 lbs for the Sample Film.

Comparative Example 4

Two Sample Films were prepared for comparison with a film manufactured by Atlantis under the tradename Linear ADU26720. The Atlantis film was a 105 gauge film while the first Sample Film was a 71 gauge film and the second Sample Film was a 105 gauge. It was determined that the Atlantis film had a film weight/load of 14.4 ounces. The 71 gauge Sample Film had a film weight/load of 9.8 ounces and the 105 gauge Sample Film had a film weight/load of 14.4 ounces. The Line Atlantis film had a containment force of 51 lbs compared with 46 lbs for the 71 gauge Sample Film and 45 lbs for the 105 gauge Sample Film.

Comparative Example 5

A Sample Film was prepared for comparison with a film manufactured by AEP. The AEP film was an 80 gauge film while the Sample Film was a 51 gauge film. It was determined that the AEP film had a film weight/load of 5.3 ounces and the Sample Film had a film weight/load of 3.3 ounces. The AEP film had a containment force of 23.5 lbs compared with 27 lbs for the Sample Film.

Comparative Example 6

A Sample Film was prepared for comparison with a film manufactured by Tyco under the tradename AMP2. The Tyco film was a 70 gauge film while the Sample Film was a 51 gauge film. It was determined that the Tyco film had a film weight/load of 8.3 ounces and the Sample Film had a film weight/load of 4.9 ounces. The Tyco film had a containment force of 26 lbs compared with 26 lbs for the Sample Film.

Comparative Example 7

A Sample Film was prepared for comparison with a film manufactured by Atlantis under the tradename Linear ADC 17820V. The Atlantis film was a 70 gauge film while the Sample Film was a 51 gauge film. It was determined that the Atlantis film had a film weight/load of 6.4 ounces and the Sample Film had a film weight/load of 4.5 ounces. The Atlantis film had a containment force of 25 lbs compared with 25 lbs for the Sample Film.

Comparative Example 8

A Sample Film was prepared for comparison with a film manufactured by Amtopp. The Amtopp film was an 80 gauge film while the Sample Film was a 51 gauge film. It was determined that the Amtopp film had a film weight/load of 5.3 ounces and the Sample Film had a film weight/load of 3.3 ounces. The Amtopp film had a containment force of 20.5 lbs compared with 27 lbs for the Sample Film.

Comparative Example 9

A Sample Film was prepared for comparison with a film manufactured by Sigma. The Sigma film was a 100 gauge film while the Sample Film was a 71 gauge film. It was determined that the Sigma film had a film weight/load of 5.1 ounces and the Sample Film had a film weight/load of 3.1 ounces. The Sigma film had a containment force of 48.5 lbs compared with 47.5 lbs for the Sample Film.

Comparative Example 10

A Sample Film was prepared for comparison with a film manufactured by AEP under the tradename TLC. The AEP film was an 80 gauge film while the Sample Film was a 51 gauge film. It was determined that the AEP film had a film weight/load of 5.5 ounces and the Sample Film had a film weight/load of 2.8 ounces. The AEP film had a containment force of 21.5 lbs compared with 23.0 lbs for the Sample Film.

Comparative Example 11

A Sample Film was prepared for comparison with a film manufactured by Linear under the tradename ADC8030V. The Linear film was an 80 gauge film while the Sample Film was a 63 gauge film. It was determined that the Linear film had a film weight/load of 28.7 ounces and the Sample Film had a film weight/load of 11.5 ounces. The Linear film had a containment force of 36 lbs compared with 43 lbs for the Sample Film.

Comparative Example 12

A Sample Film was prepared for comparison with a film manufactured by Paragon. The Paragon film was a 75 gauge film while the Sample Film was a 51 gauge film. It was determined that the Paragon film had a film weight/load of 7.7 ounces and the Sample Film had a film weight/load of 5.3 ounces. The Paragon film had a containment force of 17 lbs compared with 21 lbs for the Sample Film.

Comparative Example 13

A Sample Film was prepared for comparison with a film manufactured by AEP under the tradename PP1 8020. The AEP film was an 80 gauge film while the Sample Film was a 51 gauge film. It was determined that the AEP film had a film weight/load of 17.6 ounces and the Sample Film had a film weight/load of 8.3 ounces. The AEP film had a containment force of 19 lbs compared with 22 lbs for the Sample Film.

Comparative Example 14

A Sample Film was prepared for comparison with a film manufactured by Tyco. The Tyco film was a 70 gauge film while the Sample Film was a 51 gauge film. It was determined that the Tyco film had a film weight/load of 4.0 ounces and the Sample Film had a film weight/load of 2.6 ounces. The Tyco film had a containment force of 26 lbs compared with 28 lbs for the Sample Film.

Comparative Example 15

A Sample Film was prepared for comparison with a film manufactured by Tyco under the tradename MP2. The Tyco film was a 70 gauge film while the Sample Film was a 51 gauge film. It was determined that the Tyco film had a film weight/load of 7.6 ounces and the Sample Film had a film weight/load of 4.0 ounces. The Tyco film had a containment force of 16 lbs compared with 17 lbs for the Sample Film.

Comparative Example 16

A Sample Film was prepared for comparison with a film manufactured by Tyco. The Tyco film was an 80 gauge film while the Sample Film was a 51 gauge film. It was determined that the Tyco film had a film weight/load of 4.8 ounces and the Sample Film had a film weight/load of 2.9 ounces. The Tyco film had a containment force of 37 lbs compared with 34.5 lbs for the Sample Film.

Comparative Example 17

A Sample Film was prepared for comparison with a film manufactured by AEP under the tradename A1. The AEP film was a 75 gauge film while the Sample Film was a 51 gauge film. It was determined that the AEP film had a film weight/load of 2.4 ounces and the Sample Film had a film weight/load of 1.5 ounces. The AEP film had a containment force of 26 lbs compared with 28 lbs for the Sample Film.

Comparative Example 18

Two Sample Films were prepared for comparison with a film manufactured by Tyco. The Tyco film was an 80 gauge film while the first Sample Film was a 51 gauge film and the second Sample Film was a 63 gauge film. It was determined hat the Tyco film had a film weight/load of 8.5 ounces. The 51 gauge Sample Film had a film weight/load of 4.1 ounces and the 63 gauge Sample Film had a film weight/load of 5.6 ounces.

Comparative Example 19

A Sample Film was prepared for comparison with a film manufactured by Atlantis under the tradename Linear ADC-7020. The Atlantis film was a 70 gauge film while the Sample Film was a 51 gauge film. It was determined that the Atlantis film had a film weight/load of 5.06 ounces and the Sample Film had a film weight/load of 3.6 ounces. The Atlantis film had a containment force of 19 lbs compared with 16 lbs for the Sample Film.

Comparative Example 20

A Sample Film was prepared for comparison with a film manufactured by Linear under the tradename ADC-7020. The Linear film was an 80 gauge film while the Sample Film was a 51 gauge film. It was determined that the Linear film had a film weight/load of 7.9 ounces and the Sample Film had a film weight/load of 4.8 ounces. The Linear film had a containment force of 15 lbs compared with 22 lbs for the Sample Film.

Comparative Example 21

Two Sample Films were prepared for comparison with a film manufactured by Tyco under the tradename QM1 2010. The Tyco film was a 100 gauge film while the first Sample Film was an 80 gauge film and the second Sample Film was a 71 gauge film. It was determined that the Tyco film had a film weight/load of 7.7 ounces. The 80 gauge Sample Film had a film weight/load of 5.4 ounces and the 71 gauge Sample Film had a film weight/load of 5.0 ounces. The Tyco film had a containment force of 38 lbs compared with 36 lbs for the 80 gauge Sample Film and 42 lbs for the 71 gauge Sample Film. The higher containment force of the 71 gauge Sample Film over the 80 gauge Sample Film illustrates the optimization of beneficial properties that occurs in films of the present invention at gauge ranges of less than 80 gauge.

Comparative Example 22

A Sample Film was prepared for comparison with a film manufactured by Sigma under the tradename Select Cast. The Sigma film was an 80 gauge film while the Sample Film was a 63 gauge film. It was determined that the Sigma film had a film weight/load of 4.8 ounces and the Sample Film had a film weight/load of 4.1 ounces. The Sigma film had a containment force of 17 lbs compared with 22 lbs for the Sample Film.

Comparative Example 23

A Sample Film was prepared for comparison with a film manufactured by Paragon. The Paragon film was a 70 gauge film while the Sample Film was a 51 gauge film. It was determined that the Paragon film had a film weight/load of 6.2 ounces and the Sample Film had a film weight/load of 4.9 ounces. The Paragon film had a containment force of 33 lbs compared with 35 lbs for the Sample Film.

Comparative Example 24

A Sample Film was prepared for comparison with a film manufactured by Tyco under the tradename MP2. The Tyco film was a 100 gauge film while the Sample Film was a 71 gauge film. It was determined that the Tyco film had a film weight/load of 11.6 ounces and the Sample Film had a film weight/load of 8.1 ounces. Containment force was not measured for this comparative example.

Comparative Example 25

A Sample Film was prepared for comparison with a film manufactured by AEP under the tradename TLC. The AEP film was a 70 gauge film while the Sample Film was a 51 gauge film. It was determined that the AEP film had a film weight/load of 8.7 ounces and the Sample Film had a film weight/load of 5.5 ounces. The AEP film had a containment force of 25 lbs compared with 35 lbs for the Sample Film.

Comparative Example 26

Two Sample Films were prepared for comparison with a film manufactured by Paragon under the tradename G2.07520N.50. The Paragon film was a 75 gauge film while the first Sample Film was a 63 gauge film and the second Sample Film was a 51 gauge film. It was determined that the Paragon film had a film weight/load of 17.5 ounces. The 63 gauge Sample Film had a film weight/load of 14.5 ounces and the 51 gauge Sample Film had a film weight/load of 9.0 ounces. The Paragon film had a containment force of 35 lbs compared with 55 lbs for the 63 gauge Sample Film and 50 lbs for the 51 gauge Sample Film.

Comparative Example 27

A Sample Film was prepared for comparison with a film manufactured by Tyco under the tradename Max I. The Tyco film was an 80 gauge film while the Sample Film was a 63 gauge film. It was determined that the Tyco film had a film weight/load of 5.2 ounces and the Sample Film had a film weight/load of 4.2 ounces. The Tyco film had a containment force of 22 lbs compared with 24 lbs for the Sample Film.

Comparative Example 28

A Sample Film was prepared for comparison with a film manufactured by AEP. The AEP film was an 80 gauge film while the Sample Film was a 51 gauge film. It was determined that the AEP film had a film weight/load of 4.4 ounces and the Sample Film had a film weight/load of 3.0 ounces. The AEP film had a containment force of 12 lbs compared with 12 lbs for the Sample Film.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A multilayer stretch film comprising:
    a cling layer comprising a heterogeneously branched ultra low density polyethylene and a plastomer;
    a non-cling layer comprising a copolymer of propylene and ethylene wherein said copolymer has an ethylene content of about 1% by weight to about 10% by weight; and
    at least one core layer comprising from about 97.0–99.9% by weight linear low density polyethylene and from about 0.01–3.0% by weight low density polyethylene.

2. A multilayer stretch wrap film comprising:
    at least one first layer comprising a heterogeneously branched ultra low density polyethylene and from about 15% by weight to about 40% by weight of a plastomer;
    at least one second layer comprising a polypropylene;
    at least one third layer comprising a mixture of a linear low density polyethylene and a low density polyethylene;
    wherein said third layer is disposed between said first layer and said second layer.

3. The film of claim 2, said plastomer being an ethylene copolymerized with a $C_3$–$C_{10}$ α-olefin.

4. The film of claim 3, said plastomer being an ethylene copolymerized with a $C_8$ α-olefin.

5. The film of claim 4, said plastomer having an unstretched cling of about 250 g and a 200% stretch cling of about 66 g.

6. The film of claim 2, said plastomer having a density of from about 0.850 to about 0.900 g/cm$^3$.

7. The film of claim 2, said plastomer having a melt index of from about 1.0 to about 20.0 g/10 min.

8. A multilayer stretch wrap film comprising:
    at least one first layer comprising a heterogeneously branched ultra low density polyethylene and about 15% by weight of a plastomer;
    at least one second layer comprising a polypropylene;
    at least one third layer comprising a mixture of a linear low density polyethylene and a low density polyethylene;
    wherein said third layer is disposed between said first layer and said second layer.

9. The film of claim 8, said plastomer being an ethylene copolymerized with a $C_8$–$C_{10}$ α-olefin.

10. The film of claim 9, said plastomer being an ethylene copolymerized with a $C_8$ α-olefin.

11. The film of claim 10, said plastomer having an unstretched cling of about 250 g and a 200% stretch cling of about 66 g.

12. The film of claim 8, said plastomer having a density of from about 0.850 to about 0.900 g/cm$^3$.

13. The film of claim 8, said plastomer having a melt index of from about 1.0 to about 20.0 g/10 min.

* * * * *